(12) United States Patent
Suzuki et al.

(10) Patent No.: US 6,511,621 B2
(45) Date of Patent: Jan. 28, 2003

(54) METHOD FOR INJECTION-MOLDING A PROPELLER FAN

(75) Inventors: Atsushi Suzuki, Nishi-Kasugai-gun (JP); Masashi Inoue, Nishi-Kasugai-gun (JP); Fumio Kondoh, Nagoya (JP); Naoki Toda, Nagoya (JP); Matsuo Sakuma, Ama-gun (JP); Hirofumi Gouda, Ichihara (JP); Manabu Nomura, Ichihara (JP)

(73) Assignees: Mitsubishi Heavy Industries, Ltd., Tokyo (JP); Yagyu Rubber Co., Ltd., Nagoya (JP); Idemitsu Petrochemical Co., Ltd., Tokyo (JP)

( * ) Notice: Subject to any disclaimer, the term of this patent is extended or adjusted under 35 U.S.C. 154(b) by 11 days.

(21) Appl. No.: 09/757,618

(22) Filed: Jan. 11, 2001

(65) Prior Publication Data

US 2002/0089078 A1 Jul. 11, 2002

(51) Int. Cl.$^7$ .......................... B29C 44/02; B29C 45/46
(52) U.S. Cl. ................ 264/45.3; 264/51; 264/328.7
(58) Field of Search ................. 264/328.7, 50, 264/51, 45.3

(56) References Cited

U.S. PATENT DOCUMENTS

| 4,389,358 A | | 6/1983 | Hendry | |
| 5,948,343 A | * | 9/1999 | Hiroki et al. | 264/512 |
| 6,010,656 A | * | 1/2000 | Nomura et al. | 264/255 |
| 6,099,949 A | * | 8/2000 | Nomura et al. | 264/328.7 |
| 6,368,701 B1 | * | 4/2002 | Nomura et al. | 428/218 |

FOREIGN PATENT DOCUMENTS

| EP | 0 835 730 | 4/1998 |
| JP | 3-043224 | 2/1991 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

A method for injection-molding a plastics propeller fan by using a fixed-side mold section and movable-side mold section, comprises the steps of providing a movable core at an area corresponding to a thicker portion of a blade section of the propeller fan; after a predetermined amount of plastics material has been injected into a blade space of a mold cavity defined by the fixed-side mold section, movable-side metal section and movable core and conforming to the propeller fan, pushing out the movable core into the mold cavity and, after this step, bringing the movable core back to a normal position conforming to a mold shape defining the blade space and forming a proper fan.

6 Claims, 3 Drawing Sheets

ROTATION DIRECTION

METHOD FOR INJECTION-MOLDING A PROPELLER FAN

BACKGROUND OF THE INVENTION

The present invention relates to a method for injection-molding a propeller fan and, in particular, to a method for injection-molding a plastics propeller fan for use in an air conditioner condenser's cooling fan, ventilator, vehicle radiator's cooling fan, etc.

DESCRIPTION OF THE RELATED ART

Conventionally, a fan as shown in FIGS. 3 and 4 is known as a plastics propeller fan. Here, FIG. 3 is a plan view and FIG. 4 is a cross-sectional view taken along line IV—IV in FIG. 3, that is, shows a blade profile.

Conventionally, this kind of propeller fan has been used for the air conditioner condenser's cooling fan, ventilator, vehicle radiator's cooling fan, etc., and has been manufactured mainly using a plastics material.

The blade profile has often been formed with the use of a thin sheet and, in order to improve its aerodynamic characteristics, it is considered effective to use a fan blade having a cross-section as shown in FIG. 4. In this case, however, its cross-section includes a thicker portion.

FIG. 5 shows a conventional mold structure for injection-molding a plastics propeller fan. In FIG. 5, reference numeral 1 shows a mold having a fixed-side mold section 2 and a movable-side mold section 3. By the fixed-side mold section 2 and movable-side mold section 3 a mold cavity 8 is so defined as to conform to a fan as a product. The fixed-side mold section 1 has an inlet 4 for pouring a molten plastics material and a bushing 6 holding a pouring control pin 5 to allow it to be smoothly moved. That is, the pouring control pin 5 is so provided as to extend in the fixed-side mold section 2 and movable-side mold section 3 to allow the control pin 5 which controls the pouring of a molten plastics to be moved in a direction of an arrow A in FIG. 5. A knock-out pin 7 is provided at the movable-side metal section 3 to push out a molded fan from the mold. A knock-out pin 7 is moved in a direction of an arrow B. It is to be noted that the movable-side mold section 3, pouring control pin 5 and knock-out pin 7 have their positional movements controlled by corresponding drive sources.

A thicker blade profile, being thinner in its peripheral edge portion and thicker in its central and base portions, involves an increased weight, shrinkage and increased cycle time in a general injection-molding process, thus presenting the problem of lowering its moldability and incurring added cost.

Although a foam molding, a blow molding, etc., methods are known as the method for obtaining a good thicker molded product, but it has been difficult to obtain a uniform molded product because it is poor in shape accuracy and lower in strength and durability and there is a shrinkage speed difference between a thicker portion and a remaining portion. These result in an increase in amount of unbalance conducive to the rotation variation of the fan.

BRIEF SUMMARY OF THE INVENTION

The object of the present invention is to provide a method for injection-molding a propeller fan comprising the steps of providing a movable core at an area corresponding to a thicker portion of a blade section of a propeller fan; after a predetermined amount of plastics material has been injected into a blade space of a mold cavity defined by a fixed-side mold section, movable-side mold section and movable core and conforming to the propeller shaft, pushing out the movable core into the mold cavity; and, after this step, bringing the movable core back to a normal position conforming to a mold shape defining the blade space and forming a propeller shaft, whereby less weight difference can be achieved between a thicker portion and a thinner portion and it is possible to mass-produce uniform molded articles and it is also possible to lower an amount of unbalance conducive to the propeller fan's rotation vibration.

Further, another object of the present invention is to provide a method for projection molding a propeller fan which comprises the steps of providing a movable core at an area corresponding to a thicker portion of a blade section of a propeller fan; after the movable.core has been pushed out into a blade space of a mold cavity defined by a fixed-side mold section, movable-side mold section and movable core and conforming to the propeller fan, pressure injecting a plastics material into the mold cavity to allow the material to be filled in the mold cavity; after this step, bringing the movable core back to a normal position conforming to a mold shape defining the blade space and forming a propeller fan, whereby it is possible to obtain uniform molded products and to lower an amount of unbalance involved.

According to a first invention, a method for injection-molding a plastics propeller fan by using the fixed-side mold section and movable-side mold section comprises the steps of providing a movable core at an area corresponding to a thicker portion of a blade section of the propeller fan; after a predetermined amount of plastics material has been injected into a blade space of a mold cavity defined by the fixed-side mold section, movable-side mold section and movable core, pushing out the movable core into the mold cavity; after this step, bringing the movable core back to a normal position (a pre-moving position) conforming to a mold shape defining the blade space and forming a propeller fan. It is, therefore, possible to achieve less weight difference between a thinner portion and a thicker portion and to mass-produce uniform articles. It is also possible to provide a propeller fan which can maintain an unbalance amount conducive to the fan's rotation vibration lower.

According to the second invention, a method for projection: molding a plastics propeller fan by using a fixed-side mold section and movable-side mold section comprises the steps of providing a movable core at an area corresponding to a thicker portion of a blade section of the propeller fan; after the movable core has been pushed into a blade space of a mold cavity defined by the fixed-side mold section, movable-side mold section and movable core and conforming to the propeller fan, pressure-injecting a plastics material into the mold cavity to allow the plastics material to be filled in the mold cavity; and, after this step, bringing the movable core back to a normal position (a pre-moving position) conforming to the blade space and forming propeller fan. It is, therefore, possible to provide a propeller fan which, as in the case of the first invention, can obtain uniform articles and lower an amount of unbalance involved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
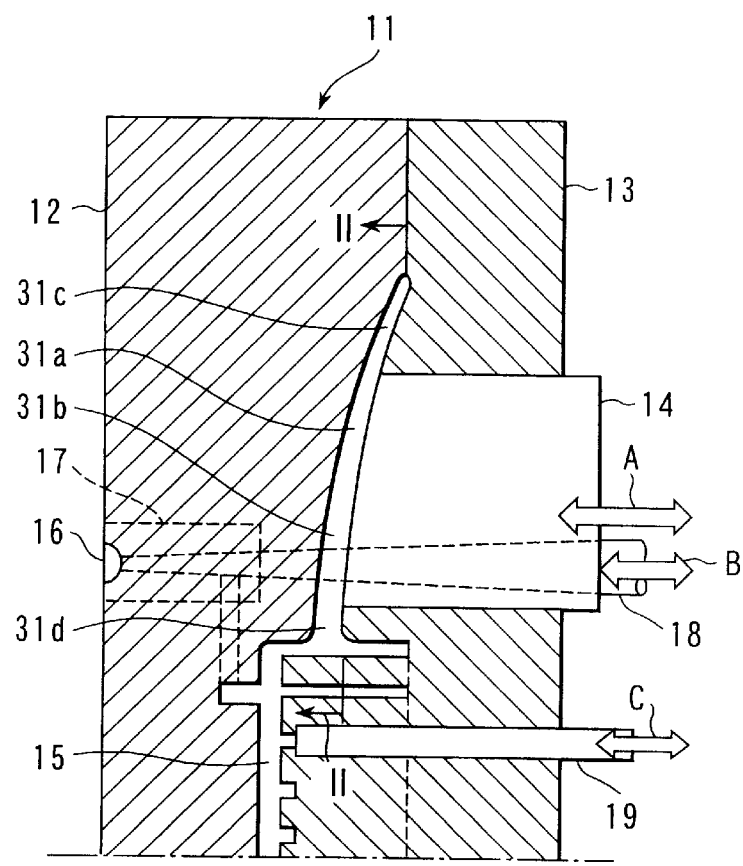
FIG. 1 is an explanatory view for explaining a mold structure for injection-molding a plastics propeller fan according to the present invention.

A method for injection-molding a plastics propeller fan according to a first invention by using a fixed-side mold section and movable-side mold section comprises the steps of providing a movable core at an area corresponding to a thicker portion of a blade section of the propeller fan; after a predetermined amount of plastics material had been injected into a blade space of a mold cavity defined by the fixed-side mold section, movable-side mold section and movable core and conforming to the propeller fan, pushing out the movable core into the mold cavity and, after its step, bringing the movable core back to a normal position (a pre-moving position) conforming to a mold shape defining the blade space and forming a propeller fan.

A method for projection molding a plastics propeller fan according to a second invention by a fixed-side mold section and movable-side mold section comprises providing a movable core at an area conforming to a thicker portion of a blade section of the propeller fan; after the movable core has been pushed out into a blade space of a mold cavity defined by the fixed-side mold section, movable-side mold section and movable core and conforming to the propeller fan, pressure-injecting a plastics material to allow the plastics material to be filled into the mold cavity; after this step, bringing the movable core back to a normal position (a pre-moving position) conforming to a mold shape defining the blade space and forming a propeller fan.

An explanation will now be made in more detail about the injection-molding method of the present invention.

As the plastics material, use can be made, in the present invention, of, for example, a reinforced plastics material P1 containing long fibers, a plastics material P2 obtained by mixing a foaming agent into a normal plastics material or a plastics material P3 obtained by mixing a foaming agent into a long-fiber reinforced plastics material. Here, the material P1 utilizes an inner spring-back force resulting from the presence of the long fibers, the material P2 utilizes its foamability and the material P3 utilized its spring-back force and foamability by which an expansion tissue is formed in a molded product. As the material P1, use is preferably made of 10 to 80 weight percent of fibers contained in a thermoplastic resin pellet, the pellet having a whole length of 2 to 100 mm, and the fiber in the pellet being substantially equal in length to the whole length of the pellet and being arranged in parallel to the longitudinal direction (a whole length) of the pellet.

In the present invention, it is preferable to perform a molding operation by abutting the movable core only against the thicker portion corresponding to the central area of the blade section without abutting it against a peripheral edge portion and base portion of the blade. Here, the step of not abutting the movable core against the peripheral edge portion and base end portion of the blade means that less inner expansion is caused to occur at these portions of the blade and the step of abutting the movable core only against the thicker portion corresponding to the central portion of the blade section means that high internal expansion occurs at that portion.

A method for molding a propeller fan according to an embodiment of the present invention will be explained below with reference to the drawing.

First, a mold structure, according to the present invention, for molding a plastics propeller fan will be explained below with reference to FIGS. 1 and 2. It is to be noted that FIG. 1 is a view generally showing the fan and that FIG. 2 is a view as taken along line II—II in FIG. 1.

Figure 2:
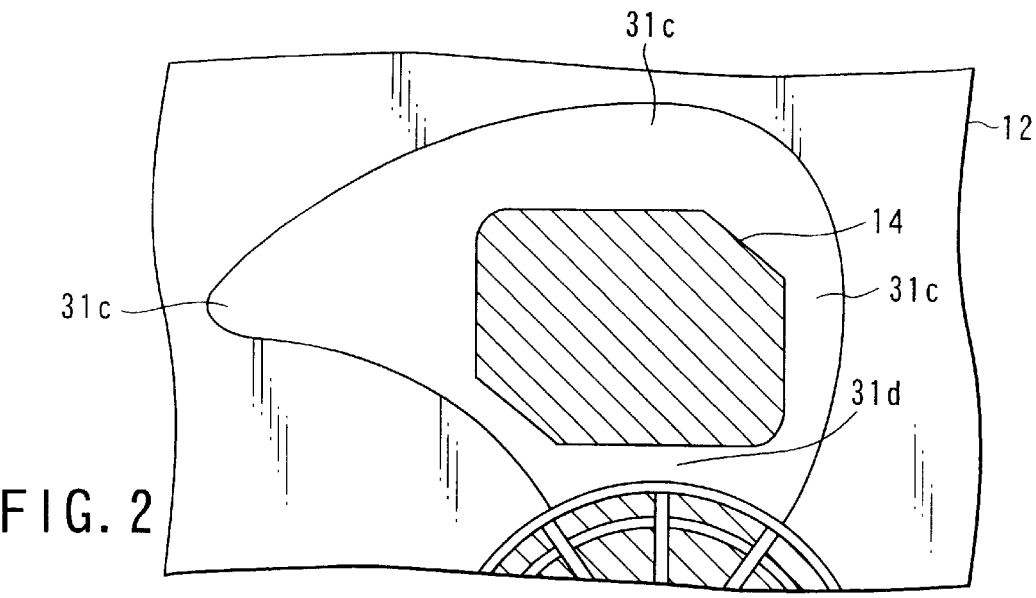
FIG. 2 is a view as seen from an arrow II—II in FIG. 1.
Figure 3:
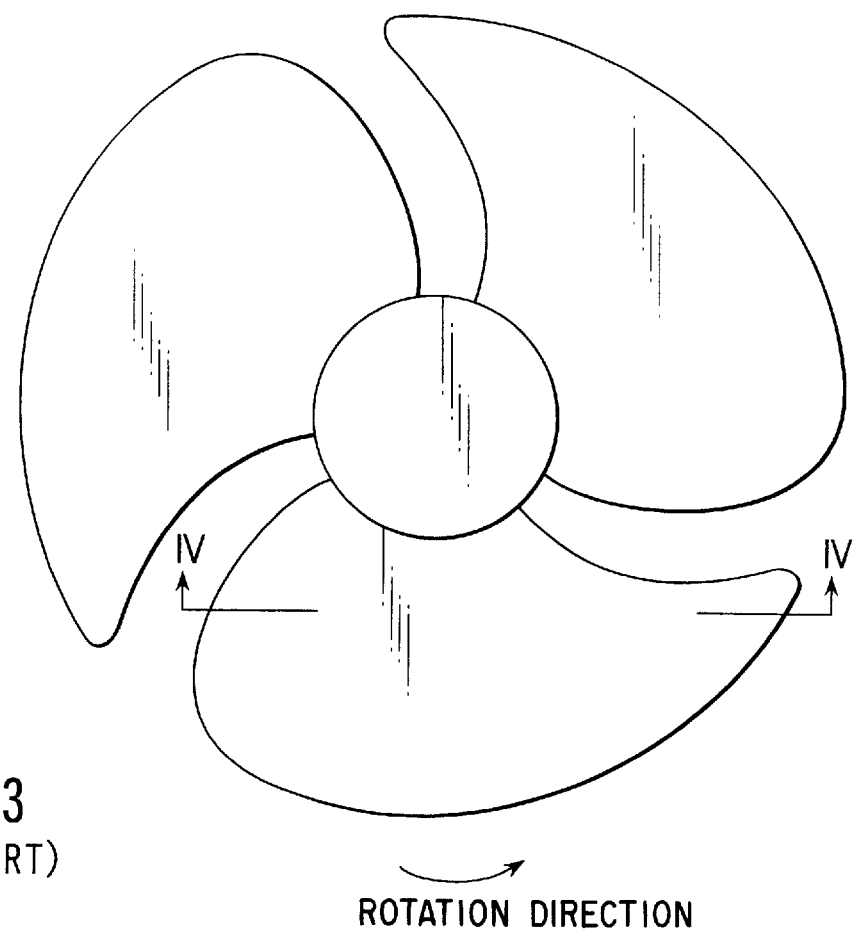
FIG. 3 is a plan view showing a plastics propeller fan.
Figure 4:
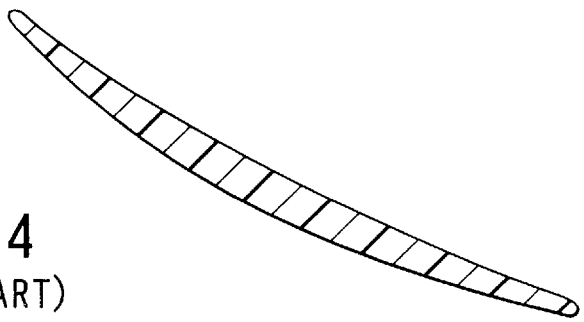
FIG. 4 is a cross-sectional view as taken along line IV—IV in FIG. 3.
Figure 5:
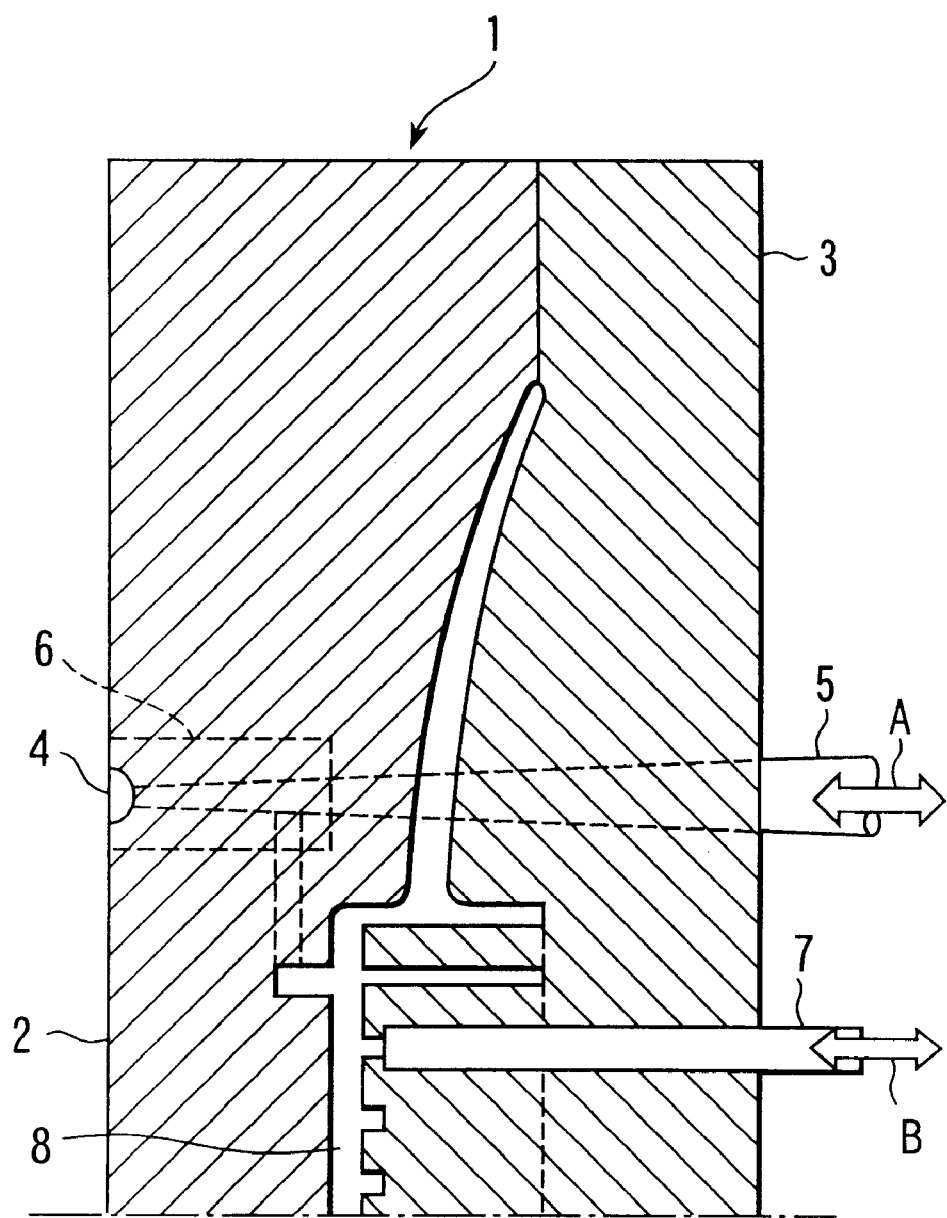
FIG. 5 is an explanatory view showing a conventional mold structure for injection-molding a plastics propeller fan.

In FIG. 1, reference number 11 shows a mold having a fixed-side mold section 12, a movable-side mold section 13 and a movable core 14. Here, the movable core 14 is provided at an area corresponding to a thicker portion 31b of a blade section 31a of the propeller fan and is movable along an arrow A direction. A mold cavity is so defined by the fixed-side mold section 12 and movable-side mold section 13 and movable core 14 as to conform to a fan as a molded product. At the fixed-side mold section 12, a pouring inlet 16 is provided for pouring a molten plastics and a bushing 17 is provided for a later-described pouring control pin to hold the control pin in such a way that it ensures a smooth movement of the control pin.

The above-mentioned control pin 18 for controlling the pouring of a molten plastics is provided such that it extends in the fixed-side mold section 12 and movable core 14 and is movable in a direction of an arrow B. At the movable-side mold section 13, a knock-out pin 19 is provided to knock out a fan as a molded product from the mold. The knock-out pin 19 is movable in a direction of an arrow C in FIG. 1. It is to be noted that the movable-side mold section 13, movable core 14, pouring control pin 18 and knock-out pin 19 have their position movements controlled by corresponding drive sources, not shown.

The movable core 14 is so shaped that it is set in contact with the thicker portion 31b of the blade section 31a of the fan in the cavity of the mold and constitutes a portion of an outline of the mold cavity 15. Further, the movable core 14 is also so shaped that it is not set in contact with a thinner portion 31c at the outer edge portion of the blade section 31a and in contact with a base portion 31d where a strength is required.

An explanation will be made below about the method for forming a plastics propeller fan with the use of the mold thus structured.

EXAMPLE 1

(1) First, the pouring control pin 18 was driven into an open position and a molten plastics material was filled via the pouring inlet 16 into the mold cavity 15 defined by the fixed-side mold section 12, movable-side mold section 13 and movable core 14. Here, use was made of, as the molten plastics material, a long-fiber reinforced plastics, that is, a long-fiber reinforced GFPP (trade name: MOSTON-L (GF30%)) made of Idemitsu Petrochemical Co., LTD, containing glass fibers, etc., of above 3 mm in length.

(2) Then, after the molten plastics material was almost filled in the mold cavity 15 conforming to the fan, the pouring control pin 18 was brought to a closed position and the movable core 14 was pushed out toward the blade section 31a side to allow the plastics material to be compressed in the mold cavity 15 and be forced into the outer edge portion of the mold cavity. Here, as a molding machine use was made of an injection-molding machine (mold clamping force: 450 tons) manufactured by Mitsubishi Heavy Industries, Ltd. The molding was performed under the conditions of a molding temperature of 250° C., mold temperature of 60° C. and injection time of five seconds, noting that an injection filling percentage was 90% relative to the cavity. After the finishing of the injection, the movable core 14 was advanced to effect compression filling.

(3) After a predetermined time, the movable core 14 was brought back to an original position corresponding to a blade section 31a shape to allow an internal expansion to be effected in the blade under a spring-back force of the long fibers in the plastics material and, until the outline of a molding product was formed to a blade shape along the shape of the mold cavity 15, the movable core 14 was held to a predetermined position.

(4) Then the plastics material which was injected into the mold cavity 15 was allowed to cool with a passage of time and, at a time when a variation of the blade profile resulting from an expansion or foaming was finished, the movable-side mold section 13 and movable core 14 were separated from the fixed-side mold section 12 and a molded product was taken out of the mold 11 by driving the knock-out pin 19. The molding cycle was 70 seconds.

In Example 1, the molten plastics material is filled via the pouring inlet 16 into the mold cavity 15 and, at a time when the plastics material is almost filled in the mold cavity, the pouring control pin 18 is brought to a closed position, the movable core 14 is pushed out toward the blade section 31a side and the plastics material in the mold cavity 15 is compressed so that the plastics material is forced into the edge portion of the mold cavity 15. After a predetermined time, a movable core 14 is brought back to the original position corresponding to the blade section 31a shape, the internal expansion is allowed to be effected under the spring-back force of the long fibers in the plastics material and, until the outline of the molding product is formed to a blade shape along the outline of the mold cavity, the movable core 14 is held to the predetermined position and, at the time when a variation of the blade profile resulting from the expansion and foaming is finished, the movable-side mold section 13 and movable core 14 are separated from the fixed-side mold section 12 and a fan is taken as a molded product out of the mold 11 by driving the knock-out pin 19.

Therefore, the plastics material is densely held at a peripheral thinner portion 31c and base end portion 31d of the fan's blade section 31a to provide an added strength. On the other hand, less plastics material is filled at the thicker section, that is, at the central section, due to the occurrence of the internal expansion and foaming. As a result, less weight difference can be achieved between the thicker portion and the thinner portion of the blade section and it is possible to mass-produce uniform molded articles and it is also possible to lower an amount of unbalance conducive to the propeller fan's rotation vibration.

In actuality, the article (molded product) thus obtained in Example 1 had a size of 400 mm and a weight of 450 g. It was possible to obtain a product of a very high dimensional accuracy, from the mold, with an amount of variation of 1 mm at max. Further, the inner voids were produced due to the occurrence of the spring-back force of the long fibers.

As control, injection-molding was performed on the equipment of Example 1 with the use of a short-fiber GFPP (GF 30%) and this was done under the conditions of a resin temperature of 230° C., mold temperature of 40° C., injection time of five seconds, pressure-maintaining time of 30 seconds, cooling time of 220 seconds and molding cycle of 280 seconds. As a result, a product had a weight of 600 g and the deformability of the product against the mold shape was 10 mm at max. and lower in dimensional accuracy and it was necessary to correct it by a second process.

EXAMPLE 2

As set out above in connection with Example 1, after the movable core 14 was pushed out toward a blade section 31a side, the plastic material was forced into the mold cavity conforming to a fan and filled there and the pouring control pin 18 is brought to a closed position. Thereafter, the similar processes as set out above in connection with the processes (3) and (4) of Example 1 were performed to obtain a plastics propeller fan.

According to the above-mentioned Example it was possible to obtain the same effects as in Example 1.

Although, in the above-mentioned embodiment, an explanation has been made about the case of using, as the plastics material, a long-fiber reinforced plastics containing glass fibers, etc., having a length of above 3 mm, the present invention is not restricted thereto and use may be made of a plastics material obtained by mixing a foaming agent into an ordinary plastics material or a plastics material obtained by mixing a foaming agent in the long-fiber reinforced plastics material.

Although, in the above-mentioned embodiment, an explanation has been made about allowing inner voids to be formed through an expansion, it may be possible to inject a gas into the inner voids so that a shape of a molded product is retained. Although, in the above-mentioned embodiment, an explanation has been made about the case of expanding the blade section, the present invention is not restricted thereto and, as required, the movable core may be abutted also against a boss (hub) section corresponding to the central portion of the fan and "be cored back" to allow an expansion of the boss section. Here, the word "be cored back" means a molding method by which the movable core is abutted against the plastics material and, after the plastics material has been injected, brought back to a normal position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for injection-molding a plastics propeller fan by using a fixed-side mold section and movable-side mold section, comprising the steps of:
   providing a movable core at an area corresponding to a thicker portion of a blade section of the propeller fan;
   after a predetermined amount of plastics material has been injected into a blade space of a mold cavity defined by the fixed-side mold section, movable-side mold section and movable core and conforming to the propeller fan, pushing out the movable core into the mold cavity; and
   thereafter, bringing the movable core back to a normal position conforming to a mold shape defining the blade space and forming a propeller fan.

2. A method for injection-molding a propeller fan according to claim 1, wherein the plastics material is comprised of any one of reinforced plastics containing long fibers, plastics containing a foaming agent, and reinforced plastics containing both the long fibers and foaming agent.

3. A method for injection-molding a plastics propeller fan by using a fixed-side mold section and movable-side mold section, comprising the steps of:

providing a movable core at an area corresponding to a thicker portion of a blade section of the propeller fan;

after a predetermined amount of plastics material has been injected into a blade space of a mold cavity defined by the fixed-side mold section, movable-side mold section and movable core and conforming to the propeller fan, pushing out the movable core into the mold cavity; and thereafter, bringing the movable core back to a normal position conforming to a mold shape defining the blade space and forming a propeller fan;

wherein the molding is performed by abutting the movable core only against a thicker portion corresponding to a central area of the blade without abutting the movable core against a blade peripheral edge portion and blade base portion of the propeller fan.

4. A method for projection molding a plastics propeller fan by using a fixed-side mold section and movable-side mold section, comprising the steps of:

providing a movable core at an area corresponding to a thicker portion of a blade section of the propeller fan;

after the movable core has been pushed out toward an inside of a blade space of a mold cavity defined by the fixed-side mold section, movable-side mold section and movable core and conforming to the propeller fan, pressure-injecting a plastics material into the mold cavity to allow the material to be filled in the mold cavity; and thereafter, bringing the movable core back to a normal position conforming to a mold shape defining the blade space and forming a propeller fan.

5. A method for projection molding a propeller fan according to claim 4, wherein the plastics material is comprised of any one of reinforced plastics containing long fibers, plastics containing a foaming agent, and reinforced plastics containing both long fibers and foaming agent.

6. A method for projection molding a plastics propeller fan by using a fixed-side mold section and movable-side mold section, comprising the steps of: providing a movable core at an area corresponding to a thicker portion of a blade section of the propeller fan;

after the movable core has been pushed out toward an inside of a blade space of a mold cavity defined by the fixed-side mold section, movable-side mold section and movable core and conforming to the propeller fan, pressure-injecting a plastics material into the mold cavity to allow the material to be filled in the mold cavity; and thereafter, bringing the movable core back to a normal position conforming to a mold shape defining the blade space and forming a propeller fan;

wherein the molding is performed by abutting the movable core only against a thicker section corresponding to a central area of the blade core without abutting a blade peripheral edge portion and blade base portion of the propeller fan.

* * * * *